(12) United States Patent
Schwarz et al.

(10) Patent No.: US 6,575,041 B2
(45) Date of Patent: *Jun. 10, 2003

(54) CAPACITIVE STRAIN GAGE AND METHOD

(75) Inventors: Robert C. Schwarz, Huntington, NY (US); Martin Kesselman, Commack, NY (US); John M. Papazian, Great Neck, NY (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,666

(22) Filed: Feb. 5, 1999

(65) Prior Publication Data

US 2002/0043112 A1 Apr. 18, 2002

(51) Int. Cl.⁷ .................................................. G01B 7/16
(52) U.S. Cl. ......................................................... 73/780
(58) Field of Search ..................... 73/780, 775, 862.64, 73/776, 718, 878.5, 141, 724, 706

(56) References Cited

U.S. PATENT DOCUMENTS

| | | | |
|---|---|---|---|
| 3,592,054 A | * 7/1971 | Stewart et al. | 73/141 |
| 3,842,509 A | 10/1974 | Wyman et al. | 33/180 |
| 4,030,347 A | * 6/1977 | Norris et al. | 73/769 |
| 4,237,989 A | * 12/1980 | Lewis | 177/210 |
| 4,310,806 A | 1/1982 | Ogasawara | 331/40 |
| 4,330,284 A | 5/1982 | Dotsko et al. | 434/38 |
| 4,429,580 A | 2/1984 | Testa et al. | 73/768 |
| 4,730,496 A | * 3/1988 | Knecht et al. | 73/724 |
| 4,831,738 A | * 5/1989 | Meline et al. | 73/780 |
| 4,944,181 A | * 7/1990 | Wnuk | 73/780 |
| 5,146,389 A | 9/1992 | Ristic et al. | 361/283 |
| 5,174,159 A | * 12/1992 | Jacobsen et al. | 73/775 |
| 5,289,722 A | * 3/1994 | Walker et al. | 73/775 |
| 5,367,199 A | * 11/1994 | Lefkowitz et al. | 307/119 |
| 5,437,196 A | 8/1995 | Okada | 73/862.043 |
| 5,469,364 A | 11/1995 | Hughey et al. | 364/482 |
| 5,661,235 A | * 8/1997 | Bonin | 73/105 |

* cited by examiner

Primary Examiner—Max Noori
(74) Attorney, Agent, or Firm—Baker Botts L.L.P.

(57) ABSTRACT

A capacitive strain gage assembly (10) for measuring strain in a component (40) includes a housing (12) attachable to the component (40) at a first location (42). The strain gage assembly (10) includes a first target sensor (24,26) and second target sensor (28,30) disposed in the housing (12). The strain gage assembly (10) also includes a sensor member (14) attachable to the component (40) at a second location (44) in movable relation to the housing (12). The sensor member (14) includes a sensor element (32) operable to transmit capacitive signals to the first and second target sensors (24,26,28,30). The sensor element (32) is disposed between the first and second target sensors (24,26,28,30). The strain gage assembly (10) may also be constructed using generally buckle resistant flexible materials for nonplanar strain measurement applications.

39 Claims, 3 Drawing Sheets

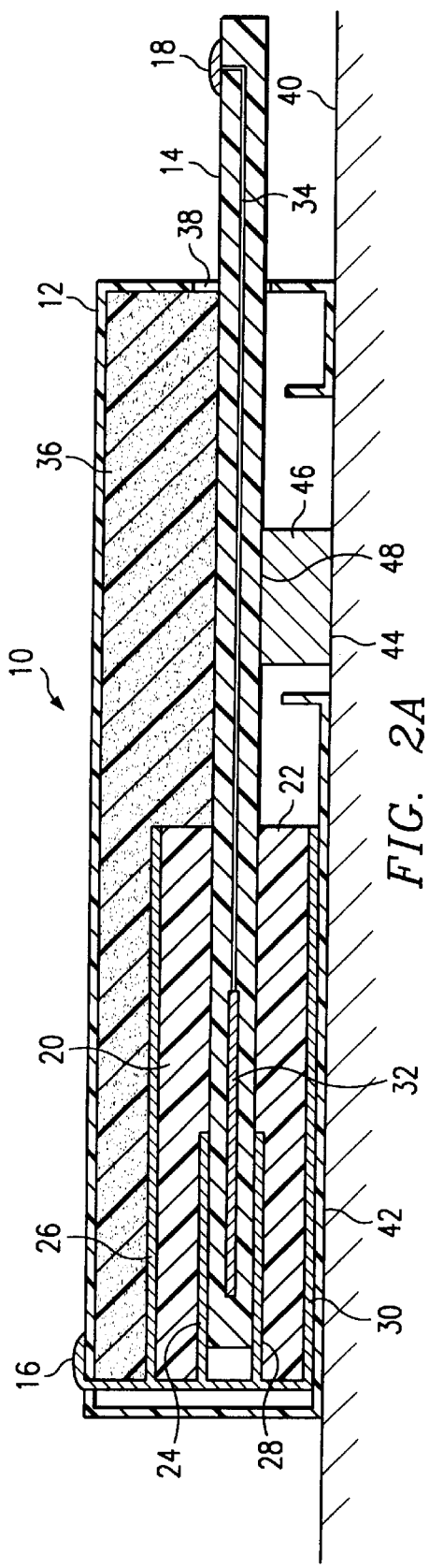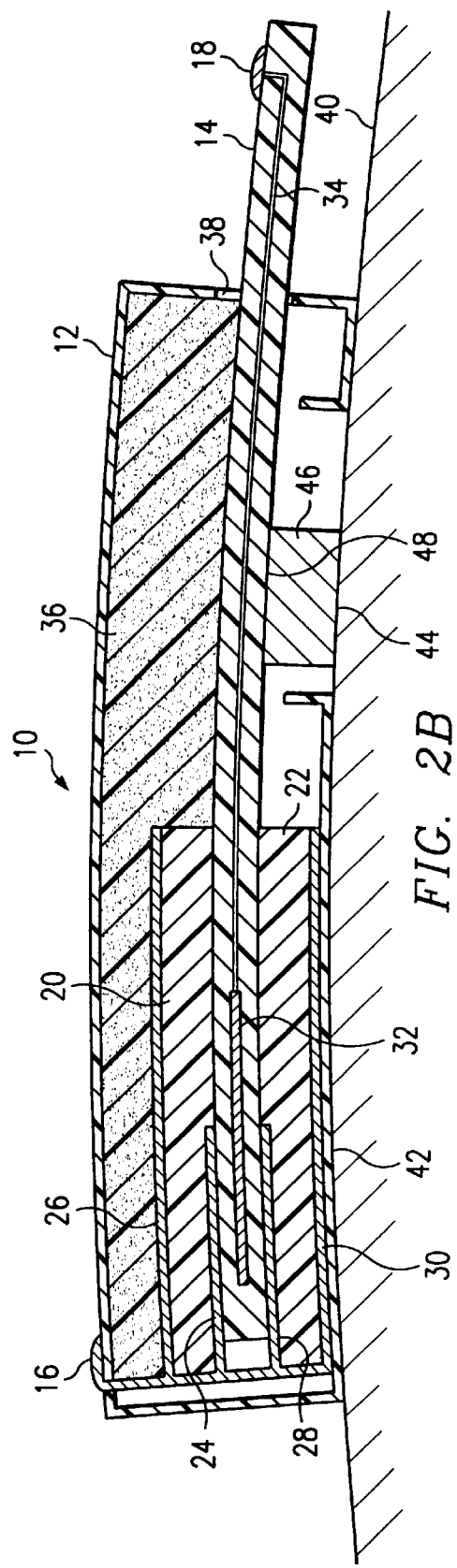

CAPACITIVE STRAIN GAGE AND METHOD

TECHNICAL FIELD OF INVENTION

This invention relates in general to the field of strain gages and, more particularly, to a capacitive strain gage and method.

BACKGROUND OF THE INVENTION

A strain gage is a device used to measure surface strains in structural materials. One type of strain gage used to measure surface strain is a foil type resistance strain gage. Another type of strain gage used to measure surface strain is a capacitive strain gage. A capacitive strain gage generally utilizes capacitors with capacitive plates or elements which are moveable relative to each other as a function of applied strain. As force is applied to the structural material, relative movement of the capacitor elements causes the capacitance to change. The change in capacitance is measured by detecting a change in an applied electrical signal.

Capacitive strain gages, however, generally measure strain in a selected axial or lateral direction. For example, as force is applied to the structural material, movement of the capacitor elements in the selected direction causes a change in capacitance. However, movement of the capacitor elements in a direction other than the selected direction may cause changes in capacitance not associated with applied strain, thereby causing erroneous strain measurements.

Additionally, nonplanar displacement of the structural material may result in erroneous strain measurements or strain gage failure. For example, using a strain gage generally requires securely affixing or bonding the strain gage to the structural material. As forces are applied to the structural material, nonplanar surface displacement of the structural material may cause the strain gage to disbond from the structural material resulting in a loss of strain measurement data.

Usage of strain gages is also generally limited to structural materials having a high modulus of elasticity. For example, foil type resistance strain gages are generally encapsulated in a polyimide resin and attached to a phenolic-type backing material. The backing material is then securely affixed to the structural material using high strength adhesives. The polyimide resin, backing material, and adhesive generally require large forces to elongate the polyimide resin, backing material and adhesive. Thus, conventional strain gages cannot accurately measure strain in low modulus of elasticity materials because the low modulus of elasticity material will elongate prior to elongation of the strain gage.

Further, nonplanar displacement of the structural material may cause erroneous strain measurements. For example, changes in distance between the capacitor elements of a capacitive strain gage in a direction other than the selected measurement direction may result in a change in capacitance unassociated with strain. Therefore, nonplanar displacement of the structural material may result in erroneous strain measurements.

SUMMARY OF THE INVENTION

Accordingly, a need has arisen for an improved capacitive strain gage and method that provide greater ease and flexibility of use. The present invention provides a capacitive strain gage and method that addresses shortcomings of prior capacitive strain gages.

According to one embodiment of the present invention, a capacitive strain gage assembly comprises a housing attachable to the component at a first location. A plurality of target members are disposed within the housing. Each target member includes a first target sensor and a second target sensor. A length of the second target sensor is greater than a length of the first target sensor. The strain gage assembly also comprises a sensor member attachable to the component at a second location in moveable relation to the housing. The sensor member is disposed between the target members adjacent the first target sensor of each target member. The sensor member includes a sensor element operable to transmit capacitive signals to the first and second target sensors of each target member.

According to another embodiment of the present invention, a method for fabricating a capacitive strain gage for measuring strain in a component comprises providing a housing attachable to a first location of the component. The method also includes securing a plurality of target members in the housing, each of the target members having a first target sensor and a second target sensor. The length of the second target sensor is greater than the length of the first target sensor of each target member. The method further includes disposing a sensor member attachable to a second location of the component in moveable relation to the housing adjacent the first target sensor of each target member. The sensor member includes a sensor element operable to transmit capacitive signals to the first and second target sensors of each target member.

Embodiments of the present invention provide several technical advantages. For example, one embodiment of the present invention provides a capacitive strain gage assembly that provides greater accuracy than prior capacitive strain gage assemblies by compensating for nonplanar displacement of the structural material. In the same embodiment, the present invention provides increased accuracy of strain measurements for nonplanar structural materials.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 2A illustrates an enlarged section view of the capacitive strain gage assembly shown in FIG. 1 taken along the line 2—2 of FIG. 1;

FIG. 2B illustrates the capacitive strain gage assembly shown in FIG. 2A used in a nonplanar application;

DETAILED DESCRIPTION OF THE INVENTION

Figure 1:
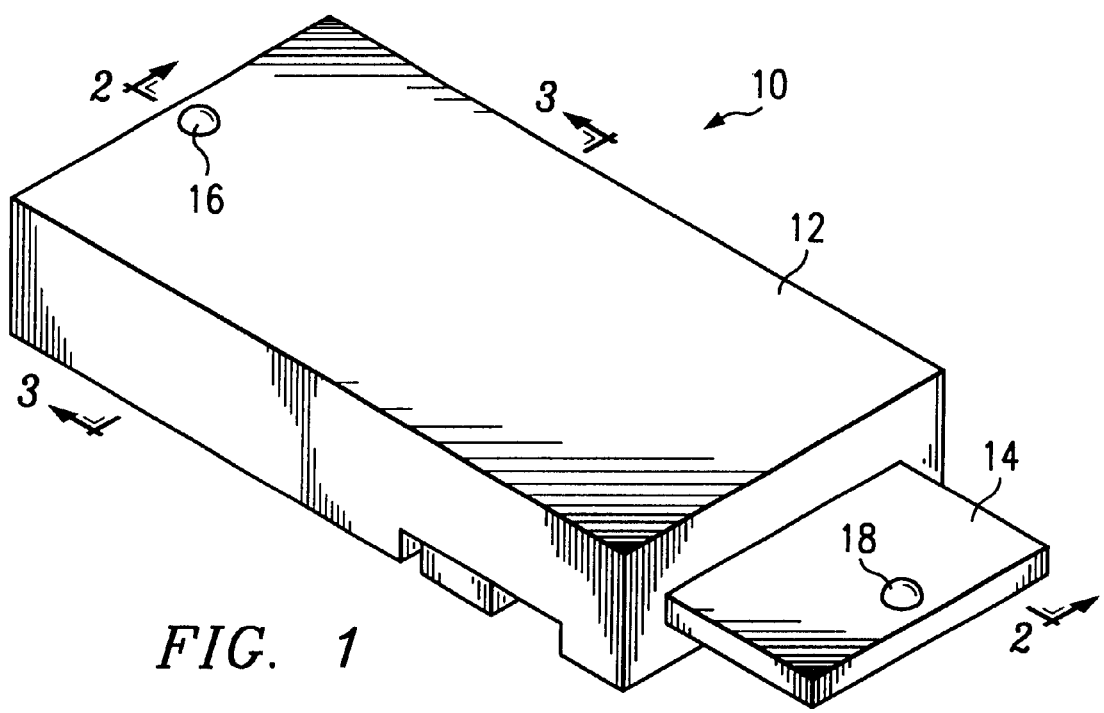
FIG. 1 illustrates an enlarged isometric view of a capacitive strain gage assembly constructed in accordance with the teachings of the present invention.
Figure 3:
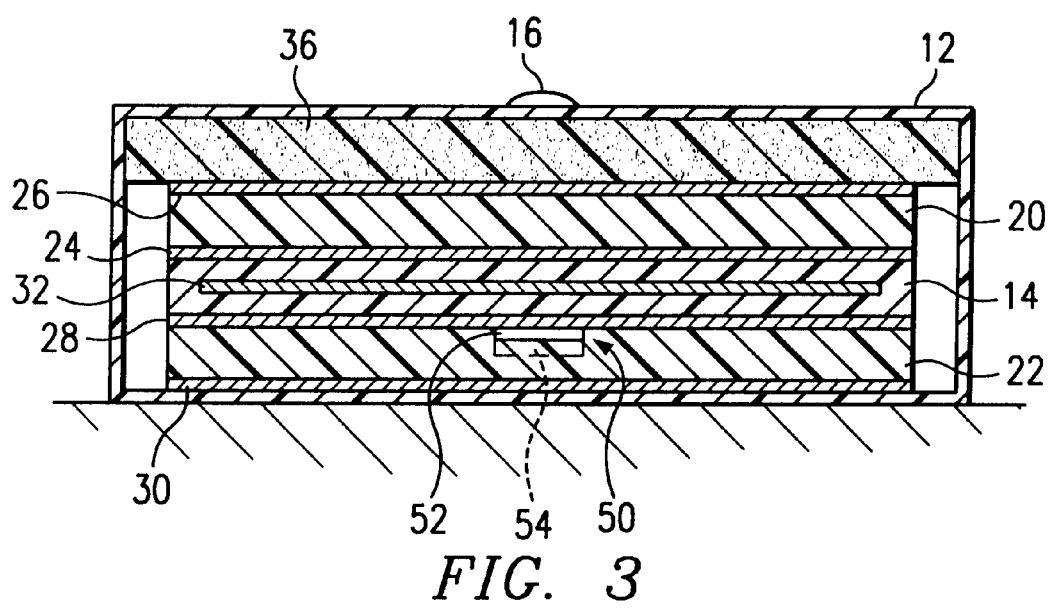
FIG. 3 illustrates an enlarged section view of the capacitive strain gage assembly shown in FIG. 1 taken along the line 3—3 of FIG. 1.

Embodiments of the present invention and its advantages are best understood by referring to FIGS. 1–3 of the drawings, like numerals being use for like and corresponding parts of the various drawings.

FIG. 1 illustrates an enlarged isometric view of one embodiment of a capacitive strain gage assembly 10 constructed in accordance with teachings of the present invention. Strain gage assembly 10 includes a housing 12 and a sensor member 14. Housing 12 includes a pad 16 for attaching a lead of a capacitive displacement readout device (not explicitly shown). Sensor member 14 also includes a pad 18 for attaching a lead from the capacitive displacement readout device. As will be described in greater detail in conjunction with FIG. 2A, strain gage assembly 10 is used to measure strain from the displacement of sensor member 14 relative to housing 12.

Housing 12 of strain gage assembly 10 is constructed using generally nonconductive materials. Housing 12 may also be constructed using generally flexible materials that provide flexibility and resist buckling. For example, housing 12 may be constructed using fiberglass circuit board material. However, other suitable materials may be used to construct housing 12. As will be described in greater detail in conjunction with FIG. 2B, constructing housing 12 using generally flexible materials allows strain gage assembly 10 to accurately measure strain in nonplanar applications.

Sensor member 14 of strain gage assembly 10 is also constructed using generally nonconductive materials. Sensor member 14 may also be constructed using generally flexible materials that provide flexibility and resist buckling. For example, sensor member 14 may be constructed using fiberglass circuit board materials; however, other suitable materials may be used for constructing sensor member 14. As will be described in greater detail in conjunction with FIG. 2B, constructing sensor member 14 using generally flexible materials allows strain gage assembly 10 to accurately measure strain in nonplanar applications.

FIG. 2A is an enlarged section view of strain gage assembly 10 shown in FIG. 1 taken along the line 2—2 of FIG. 1. In the illustrated embodiment, sensor member 14 of stain gage assembly 10 is disposed between a target member 20 and a target member 22. Target members 20 and 22 are constructed using generally nonconductive materials. Target members 20 and 22 may also be constructed using generally flexible materials that provide flexibility and resist buckling. For example, target members 20 and 22 may be constructed using fiberglass circuit board materials. However, other suitable materials may be used to construct target members 20 and 22. As will be described in greater detail in conjunction with FIG. 2B, constructing target members 20 and 22 from generally flexible materials allows strain gage assembly 10 to accurately measure strain in nonplanar applications.

In the illustrated embodiment, target members 20 and 22 are disposed adjacent to and in contact with sensor member 14. However, target members 20 and 22 may also be disposed adjacent sensor member 14 having a predetermined clearance distance to sensor member 14 (not explicitly shown). For example, disposing target members 20 and 22 a predetermined clearance distance from sensor member 14 would eliminate frictional forces between sensor member 14 and target members 20 and 22, thereby allowing easier movement of sensor member 14 relative to housing 12 and increased sensitivity of strain gage assembly 10 to surface strains.

Target member 20 of strain gage assembly 10 includes target sensors 24 and 26. Target member 22 of strain gage assembly 10 includes target sensors 28 and 30. In the illustrated embodiment, target sensors 24, 26, 28 and 30 are disposed on surfaces of target members 22 and 24, respectively. However, target sensors 24, 26, 28 and 30 may be disposed at other suitable locations and orientations of target members 22 and 24, respectively. As illustrated in FIG. 2A, target sensors 24, 26, 28, and 30 are electrically coupled together along a rearward area of housing 12. Additionally, target sensors 24, 26, 28, and 30 are electrically coupled to pad 16 for connecting to the capacitive displacement readout device.

Target sensors 24, 26, 28, and 30 are constructed using generally conductive materials, such as copper; however, other suitable conductive materials may be used for constructing target sensors 24, 26, 28, and 30. Additionally, in the illustrated embodiment, target members 20 and 22 and target sensors 24, 26, 28 and 30 are constructed having a generally flat and rectangular configuration. However, target members 20 and 22 and target sensors 24, 26, 28 and 30 may be constructed having other suitable shapes and configurations.

As illustrated in FIG. 2A, target sensor 24 is disposed between target sensor 26 and sensor member 14. Additionally, target sensor 28 is disposed between target sensor 30 and sensor member 14. Target sensor 26 of target member 20 is constructed having a length greater than a length of target sensor 24. Therefore, target sensor 26 is constructed having a greater cross sectional area than target sensor 24. Additionally, target sensor 30 of target member 22 is constructed having a length greater than target sensor 28. Therefore, target sensor 30 is constructed having a greater cross sectional area than target sensor 28. As will be described in greater detail below, the difference in cross sectional areas between target sensors 24 and 26 and between target sensors 28 and 30 provides increased sensitivity of strain gage assembly 10.

Sensor member 14 of strain gage assembly 10 also includes a sensor element 32 for transmitting capacitive signals to target sensors 24, 26, 28, and 30. In the illustrated embodiment, sensor element 32 is disposed at a mid-plane of sensor member 14. For example, sensor member 14 may be constructed having sensor element 32 centrally disposed between flexible fiberglass circuit board materials. However, sensor element 32 may be disposed at other suitable locations and orientations of sensor member 14 provided sensor element 32 does not contact target sensors 24 and 28. As will be described in greater detail in conjunction with FIG. 2B, constructing sensor member 14 from flexible materials allows strain gage assembly 10 to measure strain in nonplanar applications.

Sensor element 32 of sensor member 14 is constructed using generally conductive materials such as copper; however, sensor element 32 may be constructed using other suitable conductive materials. Sensor member 14 also includes a sensor lead 34 for electrically coupling sensor element 32 to pad 18. As described above, pad 18 provides an attachment location for the capacitive displacement readout device.

In the embodiment illustrated in FIG. 2A, strain gage assembly 10 also includes a pressure element 36. Pressure element 36 provides a generally light force to target member 20 for maintaining contact between target members 20 and 22 and sensor member 14 and allowing movement of sensor member 14 relative to target members 20 and 22. In the embodiment illustrated in FIG. 2, pressure element 36 is constructed using a foam material; however, pressure element 36 may be constructed using other suitable materials.

As illustrated in FIG. 2A, sensor member 14 is disposed between target members 20 and 22 and extends through an opening 38 of housing 12. In operation, housing 12 is attached to a component 40 at attachment location 42. Housing 12 may be attached to component 14 using low melting point adhesives or double-sided tape; however, other suitable materials and methods may be used to attach housing 12 to component 40 at attachment location 42.

Sensor member 14 is attached to component 40 at attachment location 44. A support 46 may be used to couple sensor member 14 to component 40 at attachment location 44. However, sensor member 14 may be constructed so that support 46 is an integral extension of sensor member 14. In the embodiment illustrated in FIG. 2, support 46 is also secured to sensor member 14 at attachment location 48. Support 46 may be secured to sensor member 14 and component 40 using low melting point adhesives or double-sided tape; however, other suitable materials or methods may be used to attach support 46 to sensor member 14 and component 40.

The operation of strain gage assembly 10 will now be briefly described. Capacitance is generally a function of a distance between two capacitive elements and an overlapping cross sectional area between the two capacitive elements. For example, capacitance may be generally defined by the following equation:

$$C = \frac{\epsilon A}{d} \quad (1)$$

where C is the capacitance between capacitive elements, $\epsilon$ is the dielectric constant of the material used to construct the capacitive elements, A is the amount of cross sectional area overlap of the capacitive elements, and d is the distance between the capacitive elements. Thus, capacitance is inversely proportional to the distance between the capacitive elements and directly proportional to the amount of cross sectional area overlap between the two capacitive elements.

Referring to FIG. 2A, as forces are applied to component 40 causing strain and surface displacement of component 40, surface displacement of component 40 between attachment location 42 and attachment location 44 causes sensor member 14 to move or translate between target members 20 and 22. For example, surface displacement of component 40 may cause the distance between attachment location 42 and attachment location 44 to increase, thereby causing sensor member 14 to translate in a forward displacement direction away from the rearward area of housing 12. As sensor member 14 translates in the forward displacement direction, the amount of cross sectional area overlap between sensor element 32 and target sensors 24, 26, 28 and 30 changes. However, the distance between sensor element 32 and target sensors 24, 26, 28 and 30 remains generally constant. Thus, the movement of sensor member relative to target members 20 and 22 causes a change in capacitance.

For ease of illustration, the change in capacitance of strain gage assembly 10 due to the movement of sensor member 14 relative to target members 20 and 22 will be described by illustrating the change in capacitance relative to sensor member 14 and only target member 20. For example, the capacitance between sensor member 14 and target member 20 may be generally defined by the following equation:

$$C_1 = \frac{\epsilon A_1}{d_1} + \frac{\epsilon A_2}{d_2} \quad (2)$$

where $C_1$ is the total capacitance between sensor element 32 and target sensors 24 and 26, $\epsilon$ is the dielectric constant of the material used to construct sensor element 32 and target sensors 24 and 26, $A_1$ is the cross sectional area overlap between sensor element 32 and target sensor 24, $d_1$ is the distance between sensor element 32 and target sensor 24, $A_2$ is the cross sectional area overlap between sensor element 32 and target sensor 26, and $d_2$ is the distance between sensor element 32 and target sensor 26. For ease of illustration, the materials used to construct sensor element 32 and target sensors 24 and 26 for this example have the same dielectric constant $\epsilon$; however, other suitable materials having different dielectric constants may be used to construct sensor element 32 and target sensors 24 and 26.

As sensor member 14 translates in a forward displacement direction relative to target member 20, the value of $A_1$ decreases and the value of $A_2$ increases. However, the values of $d_1$ and $d_2$ remain generally constant because the distances between sensor element 32 and target sensors 24 and 26 remain generally constant. Therefore, the capacitance between sensor element 32 and target sensors 24 and 26, defined generally as $C_1$, changes due to movement of sensor member 14 relative to target member 20. The change in capacitance between sensor element 32 and target sensors 24 and 26 due to movement of sensor element 32 relative to target sensors 24 and 26 is described more fully below in connection with FIG. 4 and Appendix A.

Accordingly, the total capacitance of strain gage assembly 10 may be generally defined by the following equation:

$$C_{total} = C_1 + C_2 \quad (3)$$

where $C_{total}$ is the total capacitance of strain gage assembly 10, $C_1$ is the capacitance between sensor element 32 and target sensors 24 and 26, and $C_2$ is the capacitance between sensor element 32 and target sensors 28 and 30. As previously described, target sensors 24, 26, 28 and 30 are electrically coupled together along the rearward area of housing 12. Thus, strain gage assembly 10 measures strain using a plurality of capacitive elements coupled in parallel. Therefore, strain gage assembly 10 provides greater accuracy and sensitivity than prior capacitive strain gages.

Additionally, the capacitive sensitivity of strain gage assembly 10 may be increased by constructing sensor element 32 having a length greater than or equal to the length of target sensors 26 and 30. For example, referring to FIG. 2A and equation (2), as sensor element 32 translates in a forward displacement direction, the values of $A_1$ and $A_2$ would both decrease, thereby causing a capacitance change associated with both target sensor 24 and target sensor 26. This example is described more fully below in connection with FIG. 5 and Appendix B.

Additionally, sensor element 32 and target sensors 24, 26, 28 and 30 may be constructed having various shapes to increase or decrease changes in capacitance due to displacement of sensor element 32 resulting from varying cross sectional area overlap between sensor element 32 and target sensors 24, 26, 28 and 30. For example, sensor element 32 may be constructed having a generally triangular cross sectional area. This example is described more fully below in connection with FIG. 6 and Appendix C.

Strain gage assembly 10 also provides greater accuracy than prior capacitive strain gage assemblies by compensating for nonplanar displacement of sensor member 14 relative to target members 20 and 22. For example, as described above, capacitance is generally a function of the distance between capacitive elements. Thus, as the distance between capacitive elements changes, the capacitance changes inversely between the capacitive elements. Therefore, nonplanar displacement of sensor member 14 relative to target members 20 and 22 may cause capacitive changes unassociated with surface displacement of component 40 in a planar displacement direction.

Strain gage assembly 10, however, provides greater accuracy than prior capacitive strain gages by compensating for nonplanar displacement of sensor member 14 relative to target members 20 and 22 by using a plurality capacitive elements. Referring to FIG. 2A, for example, strain gage assembly 10 includes target member 20 disposed above sensor member 14 and target member 22 disposed below sensor member 14. If sensor member 14 moves toward target member 20 due to nonplanar displacement of sensor member 14, sensor member 14 would move away from target member 22 a corresponding amount. Thus, the change in distances between sensor element 32 and target sensors 24 and 26 would be compensated by a corresponding change in distances between sensor element 32 and target sensors 28 and 30. Therefore, capacitance changes due to nonplanar displacement of sensor member 14 are substantially reduced. Thus, strain gage assembly 10 provides greater accuracy than prior capacitive strain gages by compensating for nonplanar displacement of component 40.

Additionally, strain gage assembly 10 provides greater flexibility than prior strain gages by allowing strain to be measured in components having a low modulus of elasticity. For example, strain gage assembly 10 may be secured to a low modulus of elasticity component 40 at attachment location 42 and attachment location 44. Generally small forces applied to the low modulus of elasticity component 40 will cause surface displacement of component 40 between attachment location 42 and attachment location 44, thereby causing movement of sensor member 14 relative to target members 20 and 22. Thus, generally small forces applied to the low modulus of elasticity component 40 result in measurable capacitance changes. Therefore, strain gage assembly 10 provides greater flexibility than prior strain gages by allowing strain to be measured in low modulus of elasticity components 40.

FIG. 2B illustrates strain gage assembly 10 shown in FIG. 2A used in a nonplanar application. For example, strain gage assembly 10 provides greater accuracy and flexibility than prior capacitive strain gages by allowing strain to be measured in nonplanar components 40. For example, as previously described, housing 12, sensor member 14, and target members 20 and 22 may be constructed using generally flexible materials that resist buckling, such as flexible fiberglass or kapton circuit board material. The flexible characteristics of housing 12, sensor member 14, and target members 20 and 22 allow strain gage assembly 10 to be secured to nonplanar components 40.

Additionally, forces applied to component 40 resulting in nonplanar displacement of component 40 may be accurately measured using strain gage assembly 10. For example, as previously described, housing 12, sensor member 14, and target members 20 and 22 may be constructed using generally flexible materials allowing strain gage assembly 10 to accommodate nonplanar displacement of component 40. Thus, strain gage assembly 10 provides greater accuracy and flexibility than prior strain gage assemblies by accommodating nonplanar components 40 and nonplanar displacements of components 40.

FIG. 3 is an enlarged section view of strain gage assembly 10 shown in FIG. 1 taken along the line 3—3 of FIG. 1. In the embodiment illustrated in FIG. 3, strain gage assembly 10 also includes an alignment element 50 for providing controlled directional displacement of sensor member 30 relative to target members 20 and 22. For example, alignment element 50 may be used to maintain longitudinal displacement of sensor member 14 relative to target members 20 and 22. In the embodiment illustrated in FIG. 3, alignment element 50 includes an alignment key 52 disposed on sensor member 14 and an alignment grove 54 disposed in target member 22. Alignment key 52 cooperates with alignment grove 54 to restrain movement of sensor member 14 to a desired translation direction. Thus, strain gage assembly 10 provides greater accuracy than prior capacitive strain gage assemblies by restraining movement of sensor member 14 relative to target members 20 and 22 to minimize capacitance changes unassociated with strain measurements in a desired direction.

Although the present invention and its advantages have been described in detail, it should be understood that various changes, substitutions, and alterations can be made therein without departing from the spirit and scope of the present invention as defined by the appended claims.

APPENDIX A

Figure 4:
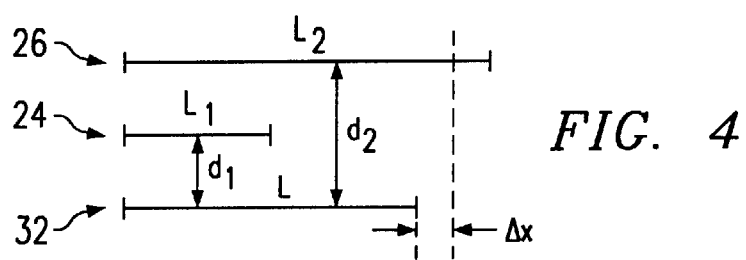
FIG. 4 is a schematic drawing in elevation for illustrating capacitive properties of one embodiment of the present invention in connection with Appendix A.

FIG. 4 is a schematic drawing in elevation illustrating one example of a positional relationship of sensor element 32 and target sensors 24 and 26 of the present invention. Prior to forward displacement of sensor element 32 relative to target sensors 24 and 26, the cross sectional area overlap between sensor element 32 and target sensors 24 and 26 may be generally defined by the following equations:

$$wL_1 = A_1 \quad (4)$$

$$w(L-L_1) = A_2 \quad (5)$$

where $A_1$ is the value of cross sectional area overlap between sensor element 32 and target sensor 24, $A_2$ is the value of cross sectional area overlap between sensor element 32 and target sensor 26, L represents the length of sensor element 32, $L_1$ represents the length of target sensor 24, and w represents the width of sensor element 32 and target sensors 24 and 26. In the illustrated example, the sensor element 32 and target sensors 24 and 26 are constructed having substantially equal widths, represented by the value w. However, sensor element 32 and target sensors 24 and 26 may be constructed having different widths.

From equations (1), (4) and (5), the capacitance between sensor element 32 and target sensors 24 and 26 prior to forward displacement of sensor element 32 may be generally expressed by the following equation:

$$C_1 = \frac{\epsilon A_1}{d_1} + \frac{\epsilon A_2}{d_2} \quad (6)$$

where $C_1$ represents the capacitance between sensor element 32 and target sensors 24 and 26, $d_1$ represents the distance between sensor element 32 and target sensor 24, $d_2$ represents the distance between sensor element 32 and target sensor 26, and $\epsilon$ represents the dielectric constant of the material used to construct sensor element 32 and target sensors 24 and 26. In the illustrated example, sensor element 32 and target sensors 24 and 26 are constructed from material having substantially equal values of dielectric constant, represented by $\epsilon$. However, sensor element 32 and target sensors 24 and 26 may be constructed from material having different values of dielectric constant.

From equations (4), (5) and (6), the capacitance between sensor element 32 and target sensors 24 and 26 may also be represented by the following equation:

$$C_1 = \epsilon w\left(\frac{L_1}{d_1} + \frac{L - L_1}{d_2}\right) \quad (7)$$

As sensor element 32 translates in a forward displacement direction relative to target sensors 24 and 26, the cross sectional area overlap between sensor element 32 and target sensors 24 and 26 may be generally represented by the following equations:

$$A'_1 = w(L_1 - \Delta x) \quad (8)$$

$$A'_2 = w(L - L_1 + \Delta x) \quad (9)$$

where $\Delta x$ represents the amount of forward displacement of sensor element 32, $A'_1$ represents the cross sectional area overlap between sensor element 32 and target sensor 24 after forward displacement of sensor element 32, and $A'_2$ represents the cross sectional area overlap between sensor element 32 and target sensor 26 after forward displacement of sensor element 32.

Based on the above equations, the capacitance between sensor element 32 and target sensors 24 and 26 after forward displacement of sensor element 32 may be generally expressed by the following equations:

$$C'_1 = \epsilon w\left(\frac{L_1 - \Delta x}{d_1} + \frac{L - L_1 + \Delta x}{d_2}\right) \quad (10)$$

$$C'_1 = \epsilon w\left(\frac{L_1}{d_1} + \frac{L - L_1}{d_2}\right) - \epsilon w\Delta x\left(\frac{1}{d_1} - \frac{1}{d_2}\right) \quad (11)$$

$$C'_1 = C_1 - \epsilon w\left(\frac{1}{d_1} - \frac{1}{d_2}\right)\Delta x \quad (12)$$

where $C'_1$ represents the value of capacitance between sensor element 32 and target sensors 24 and 26 after forward displacement of sensor element 32 by an amount equal to the value $\Delta x$.

Further, the change in capacitance between sensor element 32 and target sensors 24 and 26 resulting from forward displacement of sensor element 32 may be generally expressed as a function of the forward displacement of sensor element 32 by the following equation:

$$\frac{\Delta C}{\Delta x} = -\epsilon w\left(\frac{1}{d_1} - \frac{1}{d_2}\right) \quad (13)$$

where $\Delta C$ is the change in capacitance between sensor element 32 and target sensors 24 and 26 resulting from forward displacement of sensor element 32 by an amount equal to the value to $\Delta x$.

APPENDIX B

Figure 5:
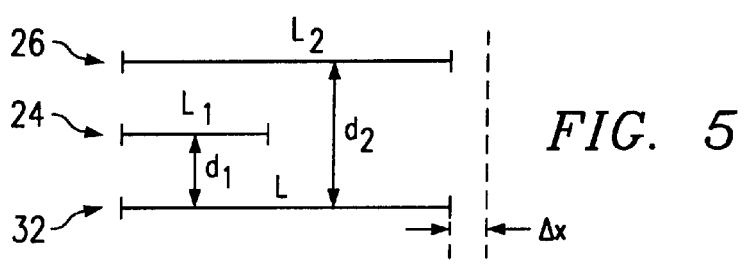
FIG. 5 is a schematic drawing in elevation for illustrating capacitive properties of an alternate embodiment of the present invention in connection with Appendix B.

FIG. 5 is a schematic drawing in elevation illustrating one example of a positional relationship of sensor element 32 and target sensors 24 and 26 of the present invention. In this example, sensor element 32 is constructed having a length substantially equal to the length of target sensor 26. Prior to forward displacement of sensor element 32 relative to target sensors 24 and 26, the cross-sectional area overlap between sensor element 32 and target sensors 24 and 26 may be generally defined by the following equations:

$$A_1 = wL_1 \quad (14)$$

$$A_2 = w(L_{2-L1}) \quad (15)$$

where $A_1$ is the value of cross-sectional area overlap between sensor element 32 and target sensor 24, $A_2$ is the value of cross-sectional area overlap between sensor element 32 and target sensor 26, $L_1$ represents the length of target sensor 24, $L_2$ represents the length of target sensor 26, and w represents the width of sensor element 32 and target sensors 24 and 26. In the illustrated example, sensor element 32 and target sensors 24 and 26 are constructed having substantially equal widths, represented by the value w. However, sensor element 32 and target sensors 24 and 26 may be constructed having different widths.

From equations (1), (14) and (15), the capacitance between sensor element 32 and target sensors 24 and 26 prior to forward displacement of sensor element 32 may be generally expressed by the following equation:

$$C_1 = \frac{\epsilon A_1}{d_1} + \frac{\epsilon A_2}{d_2} = \epsilon w\left(\frac{L_1}{d_1} + \frac{L_2 - L_1}{d_2}\right) \quad (16)$$

where $C_1$ represents the capacitance between sensor element 32 and target sensors 24 and 26, $d_1$ represents the distance between sensor element 32 and target sensor 24, $d_2$ represents the distance between sensor element 32 and target sensor 26, and $\epsilon$ represents the dielectric constant of the material used to construct sensor element 32 and target sensors 24 and 26. In the illustrated example, sensor element 32 and target sensors 24 and 26 are constructed from material having substantially equal values of dielectric constant, represented by $\epsilon$. However, sensor element 32 and target sensors 24 and 26 may be constructed from material having different values of dielectric constant.

As sensor element 32 translates in a forward displacement direction relative to target sensors 24 and 26, the cross-sectional area overlap between sensor element 32 and target sensors 24 and 26 may be generally represented by the following equations:

$$A'_1 = w(L_1 - \Delta x) \quad (17)$$

$$A'_2 = w(L_2 - L_1) \quad (18)$$

where $\Delta x$ represents the amount of forward displacement of sensor element 32, $A'_1$ represents the cross-sectional area overlap between sensor element 32 and target sensor 24 after forward displacement of sensor element 32, and $A'_2$ represents the cross-sectional area overlap between sensor element 32 and target sensor 26 after forward displacement of sensor element 32.

Based on the above equations, the capacitance between sensor element 32 and target sensors 24 and 26 after forward displacement of sensor element 32 may be generally expressed by the following equations:

$$C'_1 = \epsilon w\left(\frac{L_1 - \Delta x}{d_1} + \frac{L_2 - L_1}{d_2}\right) \quad (19)$$

$$C'_1 = \epsilon w \left( \frac{L_1}{d_1} + \frac{L_2 - L_1}{d_2} \right) - \left( \frac{\epsilon w \Delta x}{d_1} \right) \quad (20)$$

$$C'_1 = C_1 - \frac{\epsilon w \Delta x}{d_1} \quad (21)$$

where $C'_1$ represents the value of capacitance between sensor element 32 and target sensors 24 and 26 after forward displacement of sensor element 32 by an amount equal to the value $\Delta x$.

Further, the change in capacitance between sensor element 32 and target sensors 24 and 26 resulting from forward displacement of sensor element 32 may be generally expressed as a function of the forward displacement of sensor element 32 by the following equation:

$$\frac{\Delta C}{\Delta x} = \frac{-\epsilon w}{d_1} \quad (22)$$

where $\Delta C$ is the change in capacitance between sensor element 32 and target sensors 24 and 26 resulting from forward displacement of sensor element 32 by an amount equal to the value $\Delta x$. Referring to the above equation and equation (13) of Appendix A, the magnitude of the change in capacitance between sensor element 32 and target sensors 24 and 26 resulting from forward displacement of sensor element 32 an amount equal to the value of $\Delta x$ for the above illustrated example is greater than the example illustrated in Appendix A by the following amount:

$$\frac{\epsilon w}{d_2} \quad (23)$$

Thus, the capacitive sensitivity of strain gage assembly 10 may be increased by constructing sensor element 32 having a length greater than or equal to the length of target sensors 26 and 30.

APPENDIX C

Figure 6:
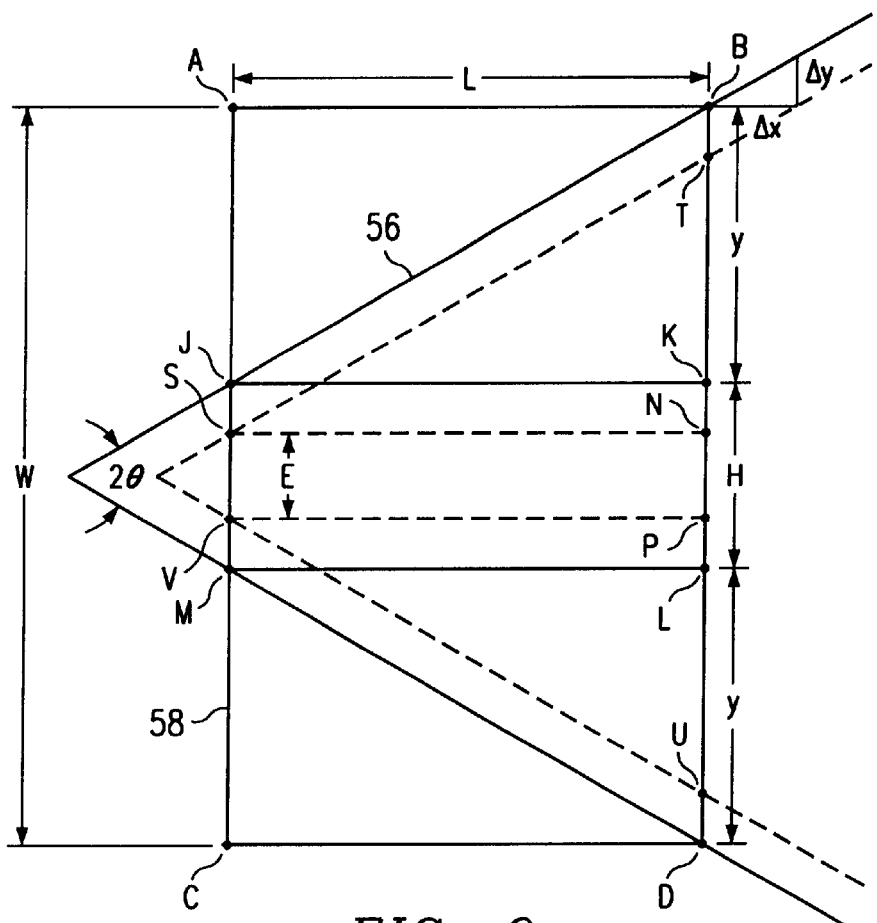
FIG. 6 is a schematic drawing for illustrating capacitive properties of an alternate embodiment of the present invention in connection with Appendix C.

FIG. 6 is a schematic drawing illustrating capacitive properties between a triangular shaped wedge 56 having an angle of 2θ and a rectangular shaped strip 58 having a length L and a width W defined by the points ABCD. The projected area between the rectangular strip 58 and triangular wedge 56 comprises a trapezoid defined by the points JBDM. The area of this trapezoid is the area of a rectangular strip of sides H and L, defined by the points JKLM, and the area of two right triangles of base L and altitude y, defined by the points JBK and MDL, where y may be generally defined by the following equation:

$$y = L \tan \Theta \quad (24)$$

Thus, the projected area between the rectangular strip 58 and the triangular wedge 56 may be generally expressed by the following equations:

$$A = HL + 2\left(\frac{1}{2}\right)(L)(L \tan \Theta) = HL + L^2 \tan \Theta \quad (25)$$

$$A = L(H+y) \quad (26)$$

where A is the projected area between the rectangular strip 58 and the triangular wedge 56.

If the triangular wedge 56 is translated to the right relative to the rectangular strip 58, the resulting projected area between the triangular wedge 56 and the rectangular strip 58 comprises a trapezoid defined by the points STUV. The area of this trapezoid is the area of a rectangular strip, defined by the points SNPV, and the area of two right triangles, defined by the points STN and VPU. The areas of triangles STN and VPU are equal to the areas of triangles JBK and MDL discussed above. Thus, the projected area between triangular wedge 56 and rectangular strip 58 after rightward displacement of triangular wedge 56 may generally be expressed by the following equations:

$$E = H - 2\Delta y \quad (27)$$

$$\Delta y = \Delta x \tan \Theta \quad (28)$$

$$A' = L(H - 2\Delta y) + Ly \quad (29)$$

$$A' = L(H+y) - 2L\Delta y \quad (30)$$

$$A' = A - 2L\Delta x \tan \Theta \quad (31)$$

where $\Delta x$ is the amount of rightward displacement of the triangular wedge 56 relative to the rectangular strip 58, A' is the projected area between the triangular wedge and the rectangular strip after rightward displacement of this triangular wedge 56, and E is the width of the rectangular strip defined by the points SNPV.

Referring to FIG. 4 where target sensor 24 is constructed having a length of $L_1$ and target sensor 26 is constructed having a length of $L_2$, and where sensor element 32 is constructed having a generally triangular cross section as described above, the capacitance between the triangular-shaped sensor element 32 and target sensors 24 and 26 may be generally expressed by the following equations:

$$C_1 = \frac{\epsilon A_1}{d_1} + \frac{\epsilon A_2}{d_2} \quad (32)$$

$$A_1 = L_1(H + L_1 \tan \Theta) \quad (33)$$

$$A_2 = L_2(H + L_1 \tan \Theta + L_2 \tan \Theta) \quad (34)$$

where $C_1$ is the capacitance between the triangular-shaped sensor element 32 and target sensors 24 and 26, $A_1$ is the amount of cross sectional area overlap between the triangular-shaped sensor element 32 and target sensor 24, $A_2$ is the amount of cross sectional area overlap between the triangular-shaped sensor element 32 and target sensor 26, and ε represents the dielectric constant of the material used to construct the triangular-shaped sensor element and target sensors 24 and 26.

As the triangular-shaped sensor element 32 translates in a forward displacement direction relative to target sensors 24 and 26, the cross sectional area overlap between the triangular-shaped sensor element 32 and target sensors 24 and 26 may be generally represented by the following equations:

$$A'_1 = A_1 - 2L_1 \Delta x \tan \Theta \quad (35)$$

$$A'_2 = A_2 - 2L_2 \Delta x \tan \Theta \quad (36)$$

where $\Delta x$ represents the amount of forward displacement of the triangular-shaped sensor element 32, $A'_1$ represents the cross sectional area overlap between the triangular-shaped sensor element 32 and target sensor 24 after forward displacement of the triangular-shaped sensor element 32, and $A'_2$ represents the cross sectional area overlap between the triangular-shaped sensor element 32 and target sensor 26 after forward displacement of the triangular-shaped sensor element 32.

Using the above equations, the capacitance between the triangular-shaped sensor element 32 and target sensors 24 and 26 after forward displacement of the triangular-shaped sensor element 32 may be generally expressed by the following equations:

$$C'_1 = \frac{\in A_1}{d_1} - \frac{\in 2L_1 \Delta x \tan\Theta}{d_1} + \frac{\in A_2}{d_2} - \frac{\in 2L_2 \Delta x \tan\Theta}{d_2} \quad (37)$$

$$C'_1 = C_1 - \in \Delta x \tan\Theta\left(\frac{L_1}{d_1} + \frac{L_2}{d_2}\right) \quad (38)$$

where $C'_1$ represents the value of capacitance between the triangular-shaped sensor element 32 and target sensor 24 and 26 after forward displacement of the triangular-shaped sensor element 32 by an amount equal to the value $\Delta x$.

The change in capacitance resulting from forward displacement of the triangular-shaped sensor element 32 may also be generally defined by the following equations as a function of the forward displacement:

$$\frac{\Delta C}{\Delta x} = - \in \tan\Theta\left(\frac{L_1}{d_1} + \frac{L_2}{d_2}\right) \quad (39)$$

where $\Delta C$ is the change in capacitance between the triangular-shaped sensor element 32 and target sensors 24 and 26 resulting from forward displacement of the triangular-shaped sensor element 32 by an amount equal to the value of $\Delta x$. As illustrated in equation (39), the change in capacitance to target sensor 26 adds to the total capacitance instead of subtracting from the total capacitance. Thus, sensor element 32 and target sensors 24, 26, 28 and 30 may be constructed having various shapes to increase or decrease changes in capacitance due to displacement of sensor element 32.

What is claimed is:

1. A capacitive strain gage assembly, comprising:

a housing attachable to a component at a first location;

a first capacitive target sensor disposed within the housing;

a second capacitive target sensor disposed within the housing in a generally parallel relationship with the first capacitive target sensor;

a third capacitive target sensor disposed within the housing in a generally parallel relationship with the second capacitive target sensor;

a fourth capacitive target sensor disposed within the housing in a generally parallel relationship with the third capacitive target sensor;

a sensor member positioned in a generally parallel relationship with the first, second, third, and fourth capacitive target sensors and disposed between the second and third capacitive target sensors, the sensor member attachable to the component at a second location and movable relative to the housing and the first, second, third, and fourth capacitive target sensors, the sensor member having a capacitive sensor element movable with the sensor member in a direction generally parallel with the first, second, third, and fourth capacitive target sensors to vary the capacitance between the sensor member and the first capacitive target sensor, the second capacitive target sensor, the third capacitive target sensor, and the fourth capacitive target sensor; and a pressure element disposed within the housing and positioned to maintain the sensor member in contact with the second and third capacitive target sensors.

2. The assembly of claim 1, wherein:

the first and second capacitive target sensors comprise a first target member; and the third and fourth capacitive target sensors comprise a second target member.

3. The assembly of claim 2, wherein the sensor member and the first and second target members comprise a generally buckle resistant flexible material.

4. The assembly of claim 1, further comprising a pressure element disposed within the housing and positioned to maintain the sensor member in contact with the second and third capacitive target sensors.

5. The assembly of claim 4, wherein the pressure element comprises a foam material.

6. The assembly of claim 1, wherein the sensor member includes a first surface and a second surface, and the sensor element is symmetrically disposed between the first and second surfaces.

7. The assembly of claim 1, further comprising an alignment element disposed within the housing and operable to maintain generally unidirectional movement of the sensor member relative to the first, second, third, and fourth capacitive target sensors.

8. The assembly of claim 1, wherein:

the first capacitive target sensor comprises a first cross sectional area in a plane generally parallel with the first capacitive target sensor and the second capacitive target sensor comprises a second cross sectional area in a plane generally parallel with the second capacitive target sensor, the first cross sectional area larger than the second cross sectional area; and the third capacitive target sensor comprises a third cross sectional area in a plane generally parallel with the third capacitive target sensor and the fourth capacitive target sensor comprises a fourth cross sectional area in a plane generally parallel with the fourth capacitive target sensor, the fourth cross sectional area larger than the third cross sectional area.

9. The assembly of claim 1, wherein the first capacitive target sensor, the second capacitive target sensor, the third capacitive target sensor, and the fourth capacitive target sensor compensate for non-planar displacements of the sensor member.

10. A capacitive strain gage assembly, comprising:

a housing attachable to a first location of a component;

a first capacitive target sensor disposed within the housing and having a first cross sectional area in a plane generally parallel with the first capacitive target sensor;

a second capacitive target sensor disposed within the housing in a generally parallel relationship with the first capacitive target sensor and having a second cross sectional area in a plane generally parallel with the second capacitive target sensor, the second cross sectional area smaller than the first cross sectional area;

a sensor member positioned in a generally parallel relationship with the first and second capacitive target sensors, the second capacitive target sensor disposed between the first capacitive target sensor and the sensor member, the sensor member attachable to the component at a second location and movable relative to the housing and the first and second capacitive target sensors, the sensor member having a capacitive sensor element movable with the sensor member in a direction generally parallel with the first and second capacitive target sensors to vary the capacitance between the sensor member and the first capacitive target sensor and the second capacitive target sensor; and a pressure element disposed within the housing and positioned to maintain the sensor member in contact with the second and third capacitive target sensors.

11. The assembly of claim 10, wherein the sensor member includes a first surface and a second surface, the sensor element symmetrically disposed between the first and second surfaces.

12. The assembly of claim 10, further comprising a pressure element disposed within the housing and positioned to maintain the sensor member in contact with the second capacitive target sensor.

13. The assembly of claim 10, wherein the first and second capacitive target sensors comprise a target member, and the target member and the sensor member comprise a generally buckle resistant flexible material.

14. The assembly of claim 10, further comprising an alignment element disposed within the housing and operable to maintain generally unidirectional movement of the sensor member relative to the first and second capacitive target sensors.

15. A capacitive strain gage assembly, comprising:

a housing attachable to a component at a first location;

a first capacitive target sensor disposed within the housing;

a second capacitive target sensor disposed within the housing in a generally parallel relationship with the first capacitive target sensor;

a sensor member positioned in a generally parallel relationship with the first and second capacitive target sensors and disposed between and in contact with the first and second capacitive target sensors, the sensor member attachable to the component at a second location and movable relative to the housing and the first and second capacitive target sensors, the sensor member having a capacitive sensor element movable with the sensor member in a direction generally parallel with the first and second capacitive target sensors to vary the capacitance between the sensor member and the first capacitive target sensor and the second capacitive target sensor; and a pressure element disposed within the housing and positioned to maintain the sensor member in contact with the first and second capacitive target sensors.

16. The assembly of claim 15, wherein:

the first capacitive target sensor comprises a first target member; and the second capacitive target sensor comprises a second target member.

17. The assembly of claim 16, further comprising a pressure element disposed within the housing and positioned to maintain the sensor member in contact with the first and second target members.

18. The assembly of claim 16, wherein the sensor member and the first and second target members comprise a generally buckle resistant flexible material.

19. The assembly of claim 16, wherein the sensor member comprises:

a first surface disposed adjacent the first target member; and a second surface disposed adjacent the second target member;

wherein the sensor element is symmetrically disposed between the first and second surfaces.

20. The assembly of claim 15, further comprising:

a third capacitive target sensor, the first capacitive target sensor disposed between the third capacitive target sensor and the sensor member; and a fourth capacitive target sensor, the second capacitive target sensor disposed between the fourth capacitive target sensor and the sensor member.

21. The assembly of claim 20, wherein the third capacitive target sensor comprises a first cross sectional area in a plane generally parallel with the third capacitive target sensor and the first capacitive target sensor comprises a second cross sectional area in a plane generally parallel with the first capacitive target sensor, the first cross sectional area larger than the second cross sectional area.

22. The assembly of claim 15, wherein the first capacitive target sensor and the second capacitive target sensor compensate for non-planar displacements of the sensor member.

23. A method for measuring strain in a component, comprising:

attaching a housing comprising a generally parallel first capacitive target sensor and second capacitive target sensor to a first location of a component, a cross sectional area of the first capacitive target sensor in a plane generally parallel with the first capacitive target sensor larger than a cross sectional area of the second capacitive target sensor in a plane generally parallel with the second capacitive target sensor;

attaching a sensor member to a second location of the component, the sensor member positioned generally parallel to the first capacitive target sensor and the second capacitive target sensor, the second capacitive target sensor disposed between the first capacitive target sensor and the sensor member, the sensor member movable relative to the housing and the first and second capacitive target sensors in a direction generally parallel with the first and second capacitive target sensors, the sensor member comprising a capacitive sensor element movable with the sensor member;

attaching a pressure element disposed within the housing and positioned to maintain the sensor member in contact with the first and second capacitive target sensors;

detecting the change in capacitance between the sensor element, the first capacitive target sensor, and the second capacitive target sensor as the sensor member moves relative to the first and second capacitive target sensors; and determining the strain occurring in the component based on the change in capacitance.

24. A method for measuring strain in a component, comprising:

attaching a housing comprising a generally parallel first capacitive target sensor and second capacitive target sensor to a first location of a component;

attaching a sensor member to a second location of the component, the sensor member positioned generally parallel to the first capacitive target sensor and the second capacitive target sensor and disposed between and in contact with the first capacitive target sensor and the second capacitive target sensor, the sensor member movable relative to the housing and the first and second capacitive target sensors in a direction generally parallel with the first and second capacitive target sensors, the sensor member comprising a capacitive sensor element movable with the sensor member;

attaching a pressure element disposed within the housing and positioned to maintain the sensor member in contact with the first and second capacitive target sensors;

detecting the change in capacitance between the sensor element, the first capacitive target sensor, and the second capacitive target sensor as the sensor member moves relative to the first and second capacitive target sensors; and determining the strain occurring in the component based on the change in capacitance.

25. A capacitive strain gage assembly, comprising:

a support attachable to a component at a first location;

a first capacitive target sensor coupled to the support;

a second capacitive target sensor coupled to the support in a generally parallel relationship with the first capacitive target sensor;

a third capacitive target sensor coupled to the support in a generally parallel relationship with the second capacitive target sensor;

a fourth capacitive target sensor coupled to the support in a generally parallel relationship with the third capacitive target sensor;

a sensor member positioned in a generally parallel relationship with the first, second, third, and fourth capacitive target sensors and disposed between the second and third capacitive target sensors, the sensor member attachable to the component at a second location and movable relative to the support and the first, second, third, and fourth capacitive target sensors, the sensor member having a capacitive sensor element movable with the sensor member in a direction generally parallel with the first, second, third, and fourth capacitive target sensors to vary the capacitance between the sensor member and the first capacitive target sensor, the second capacitive target sensor, the third capacitive target sensor, and the fourth capacitive target sensor; and a pressure element coupled to the support and positioned to maintain the sensor member in contact with the second and third capacitive target sensors.

26. The assembly of claim 25, further comprising a pressure element disposed within the housing and positioned to maintain the sensor member in contact with the second and third capacitive target sensors.

27. The assembly of claim 25, further comprising an alignment element coupled to the support and operable to maintain generally unidirectional movement of the sensor member relative to the first, second, third, and fourth capacitive target sensors.

28. The assembly of claim 25, wherein:

the first capacitive target sensor comprises a first cross sectional area in a plane generally parallel with the first capacitive target sensor and the second capacitive target sensor comprises a second cross sectional area in a plane generally parallel with the second capacitive target sensor, the first cross sectional area larger than the second cross sectional area; and the third capacitive target sensor comprises a third cross sectional area in a plane generally parallel with the third capacitive target sensor and the fourth capacitive target sensor comprises a fourth cross sectional area in a plane generally parallel with the fourth capacitive target sensor, the fourth cross sectional area larger than the third cross sectional area.

29. The assembly of claim 25, wherein the first capacitive target sensor, the second capacitive target sensor, the third capacitive target sensor, and the fourth capacitive target sensor compensate for non-planar displacements of the sensor member.

30. A capacitive strain gage assembly, comprising:

a support attachable to a first location of a component;

a first capacitive target sensor coupled to the support and having a first cross sectional area in a plane generally parallel with the first capacitive target sensor;

a second capacitive target sensor coupled to the support in a generally parallel relationship with the first capacitive target sensor and having a second cross sectional area in a plane generally parallel with the second capacitive target sensor, the second cross sectional area smaller than the first cross sectional area;

a sensor member positioned in a generally parallel relationship with the first and second capacitive target sensors, the second capacitive target sensor disposed between the first capacitive target sensor and the sensor member, the sensor member attachable to the component at a second location and movable relative to the support and the first and second capacitive target sensors, the sensor member having a capacitive sensor element movable with the sensor member in a direction generally parallel with the first and second capacitive target sensors to vary the capacitance between the sensor member and the first capacitive target sensor and second capacitive target sensor; and a pressure element coupled to the support and positioned to maintain contact between the sensor member and the second capacitive target sensor.

31. The assembly of claim 30, further comprising an alignment element coupled to the support and operable to maintain generally unidirectional movement of the sensor member relative to the first and second capacitive target sensors.

32. The assembly of claim 30, further comprising a pressure element disposed within the housing and positioned to maintain the sensor member in contact with the second capacitive target sensor.

33. A capacitive strain gage assembly, comprising:

a support attachable to a component at a first location;

a first capacitive target sensor coupled to the support;

a second capacitive target sensor coupled to the support in a generally parallel relationship with the first capacitive target sensor;

a sensor member positioned in a generally parallel relationship with the first and second capacitive target sensors and disposed between and in contact with the first and second capacitive target sensors, the sensor member attachable to the component at a second location and movable relative to the support and the first and second capacitive target sensors, the sensor member having a capacitive sensor element movable with the sensor member in a direction generally parallel with the first and second capacitive target sensors to vary the capacitance between the sensor member and the first capacitive target sensor and second capacitive target sensor; and a pressure element coupled to the support to maintain the sensor member in contact with the first and second capacitive target sensors.

34. The assembly of claim 33, further comprising a pressure element disposed within the housing and positioned to maintain the sensor member in contact with the first and second capacitive target sensors.

35. The assembly of claim 33, further comprising:
a third capacitive target sensor, the first capacitive target sensor disposed between the third capacitive target sensor and the sensor member; and
a fourth capacitive target sensor, the second capacitive target sensor disposed between the fourth capacitive target sensor and the sensor member.

36. The assembly of claim 35, wherein the third capacitive target sensor comprises a first cross sectional area in a plane generally parallel with the third capacitive target sensor and the first capacitive target sensor comprises a second cross sectional area in a plane generally parallel with the first capacitive target sensor, the first cross sectional area larger than the second cross sectional area.

37. The assembly of claim 33, wherein the first capacitive target sensor and the second capacitive target sensor compensate for non-planar displacements of the sensor member.

38. A method for measuring strain in a component, comprising:
attaching a support comprising a generally parallel first capacitive target sensor and second capacitive target sensor to a first location of a component, a cross sectional area of the first capacitive target sensor in a plane generally parallel with the first capacitive target sensor greater than a cross sectional area of the second capacitive target sensor in a plane generally parallel with the second capacitive target sensor;
attaching a sensor member to a second location of the component, the sensor member positioned generally parallel to the first capacitive target sensor and the second capacitive target sensor, the second capacitive target sensor disposed between the first capacitive target sensor and the sensor member, the sensor member movable relative to the support and the first and second capacitive target sensors in a direction generally parallel with the first and second capacitive target sensors, the sensor member comprising a capacitive sensor element movable with the sensor member;
attaching a pressure element coupled to the support to maintain the sensor member in contact with the first and second capacitive target sensors;
detecting the change in capacitance between the sensor element, the first capacitive target sensor, and the second capacitive target sensor as the sensor member moves relative to the first and second capacitive target sensors; and
determining the strain occurring in the component based on the change in capacitance.

39. A method for measuring strain in a component, comprising:
attaching a support comprising a generally parallel first capacitive target sensor and second capacitive target sensor to a first location of a component;
attaching a sensor member to a second location of the component, the sensor member positioned generally parallel to the first capacitive target sensor and the second capacitive target sensor and disposed between and in contact with the first capacitive target sensor and the second capacitive target sensor, the sensor member movable relative to the support and the first and second capacitive target sensors in a direction generally parallel with the first and second capacitive target sensors, the sensor member comprising a capacitive sensor element movable with the sensor member;
attaching a pressure element coupled to the support to maintain the sensor member in contact with the first and second capacitive target sensors;
detecting the change in capacitance between the sensor element, the first capacitive target sensor, and the second capacitive target sensor as the sensor member moves relative to the first and second capacitive target sensors; and
determining the strain occurring in the component based on the change in capacitance.

* * * * *